United States Patent
Kulesha

(10) Patent No.: US 9,555,881 B2
(45) Date of Patent: Jan. 31, 2017

(54) PROPELLER/ROTOR CONTROL APPARATUS AND METHOD

(71) Applicant: The Boeing Company, Chicago, IL (US)

(72) Inventor: Richard L. Kulesha, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 14/242,932

(22) Filed: Apr. 2, 2014

(65) Prior Publication Data

US 2015/0284078 A1    Oct. 8, 2015

(51) Int. Cl.
*B64C 27/52* (2006.01)
*F16H 23/10* (2006.01)
*B64C 27/82* (2006.01)

(52) U.S. Cl.
CPC ............ *B64C 27/52* (2013.01); *B64C 27/82* (2013.01); *F16H 23/10* (2013.01); *Y10T 74/19502* (2015.01)

(58) Field of Classification Search
CPC .......... B64C 27/32; B64C 27/52; B64C 27/82; F16D 3/08
See application file for complete search history.

(56) References Cited

U.S. PATENT DOCUMENTS

| | | | |
|---|---|---|---|
| 379,022 A | 3/1888 | Morgan | |
| 885,401 A | 4/1908 | Tadini | |
| 1,707,530 A | 4/1929 | Messeroll | |
| 2,684,122 A | 7/1954 | Perry | |
| 2,939,300 A * | 6/1960 | Lucia | F16D 3/70 416/134 R |
| 3,118,504 A * | 1/1964 | Cresap | B64C 27/52 244/17.25 |
| 3,176,774 A * | 4/1965 | Krinsky | B64C 27/52 244/17.19 |
| 3,347,320 A | 10/1967 | Cresap et al. | |
| 4,720,059 A * | 1/1988 | Stearns, Jr. | B64C 27/52 244/17.11 |
| 4,759,514 A * | 7/1988 | Burkam | B64C 27/82 244/17.19 |

(Continued)

FOREIGN PATENT DOCUMENTS

| | | |
|---|---|---|
| GB | 143654 | 3/1919 |
| JP | 2001130494 | 5/2001 |
| JP | 4112870 | 7/2008 |

*Primary Examiner* — Christopher P Ellis
*Assistant Examiner* — Michael Wang
(74) *Attorney, Agent, or Firm* — Perman & Green, LLP

(57) ABSTRACT

An apparatus for controlling a rotor of a rotary wing aircraft, including a stationary frame, a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint, and at least one actuator coupled to the stationary frame at one end and connected to the second shaft portion at the other end so that the second shaft portion rotates relative to the at least one actuator, the at least one actuator being configured to pivot the second shaft portion in the two degrees of freedom.

20 Claims, 9 Drawing Sheets

(56) References Cited

U.S. PATENT DOCUMENTS

| | | | |
|---|---|---|---|
| 5,098,033 A * | 3/1992 | Haseloh | B64C 27/52 244/17.27 |
| 5,165,853 A * | 11/1992 | Pancotti | B64C 27/35 416/134 A |
| 5,186,686 A | 2/1993 | Staples et al. | |
| 5,305,968 A * | 4/1994 | Arlton | A63H 27/12 244/17.13 |
| 5,597,138 A * | 1/1997 | Arlton | A63H 27/12 244/17.13 |
| 6,019,578 A | 2/2000 | Hager et al. | |
| 6,030,177 A | 2/2000 | Hager | |
| 6,276,633 B1 * | 8/2001 | Balayn | B64C 29/0033 244/56 |
| 6,296,444 B1 | 10/2001 | Schellhase et al. | |
| 6,607,357 B2 | 8/2003 | Caramaschi | |
| 6,695,254 B2 | 2/2004 | Zoppitelli et al. | |
| 6,712,313 B2 | 3/2004 | Zoppitelli et al. | |
| 6,915,983 B2 * | 7/2005 | Thomassey | B64C 29/0033 244/17.25 |
| 7,867,096 B2 * | 1/2011 | Stamps | B64C 27/14 464/138 |
| 2003/0071167 A1 * | 4/2003 | Thomassey | B64C 27/28 244/6 |
| 2008/0247876 A1 | 10/2008 | Stamps et al. | |
| 2014/0169963 A1 * | 6/2014 | Carreker | F16D 3/185 416/1 |

* cited by examiner

PROPELLER/ROTOR CONTROL APPARATUS AND METHOD

BACKGROUND

Generally the pitch and roll (or yaw) of a rotor of, for example a rotary aircraft, is controlled using a swashplate mechanism. These swashplate mechanisms are generally complex and rotate in unison with the rotor.

Conventional swashplate systems utilize a control system that pitches each blade cyclically, in order to provide control over the tip path plant. As the blades and the entire hub rotate the hub needs to be moved or tilted in a given direction. Main rotors, tail rotors or compound rotors utilize the swashplate or similar means to provide necessary control of the rotor system. The controls and system components that provide the forces and the capability to move the hub and rotor are all dynamic in that these systems rotate around the main shaft at the same RPM as the hub and rotor.

SUMMARY

Accordingly, apparatus and method, intended to address the above-identified concerns, would find utility.

One example of the present disclosure relates to an apparatus for controlling a rotor of a rotary wing aircraft. The apparatus includes a stationary frame, a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint, and at least one actuator coupled to the stationary frame at one end and connected to the second shaft portion at the other end so that the second shaft portion rotates relative to the at least one actuator, the at least one actuator being configured to pivot the second shaft portion in the two degrees of freedom.

One example of the present disclosure relates to a rotary wing aircraft including a frame, a tail rotor connected to the frame, the tail rotor including a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint, and at least one actuator connected to the frame at one end and connected to the second shaft portion at the other end so that the second shaft portion rotates relative to the at least one actuator, the at least one actuator being configured to pivot the second shaft portion in the two degrees of freedom.

One example of the present disclosure relates to a method. The method includes providing a rotary wing aircraft with a rotary propulsion shaft having a first shaft portion and a second shaft portion so that the second shaft portion is pivotable relative to a centerline of the first shaft portion in two degrees of freedom about a joint, and pivoting the second shaft portion in the two degrees of freedom with at least one actuator connecting a non-rotatable frame of the rotary wing aircraft to the second shaft portion so that the second shaft portion rotates relative to the at least one actuator.

BRIEF DESCRIPTION OF THE DRAWINGS

Figure 1:
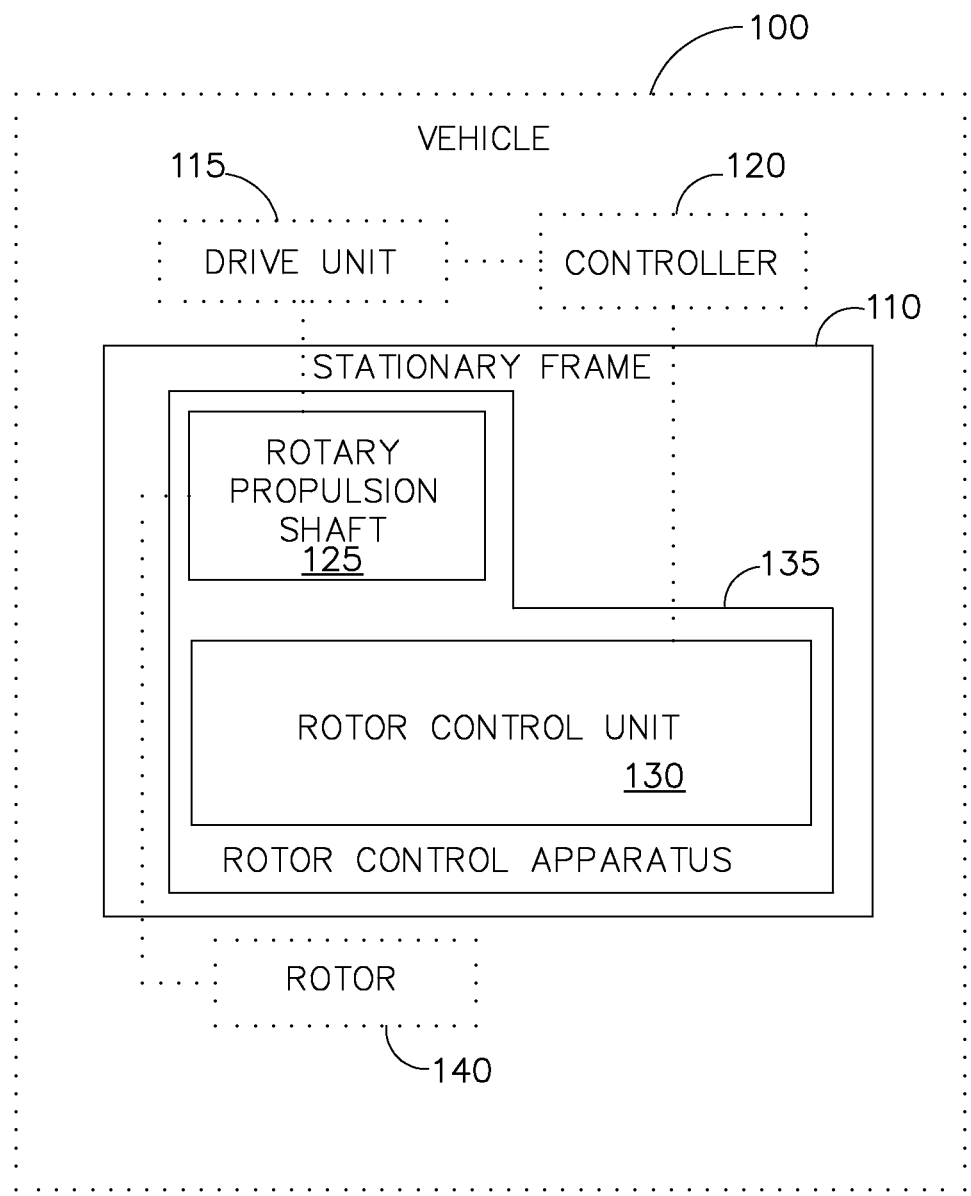
Figure 2:
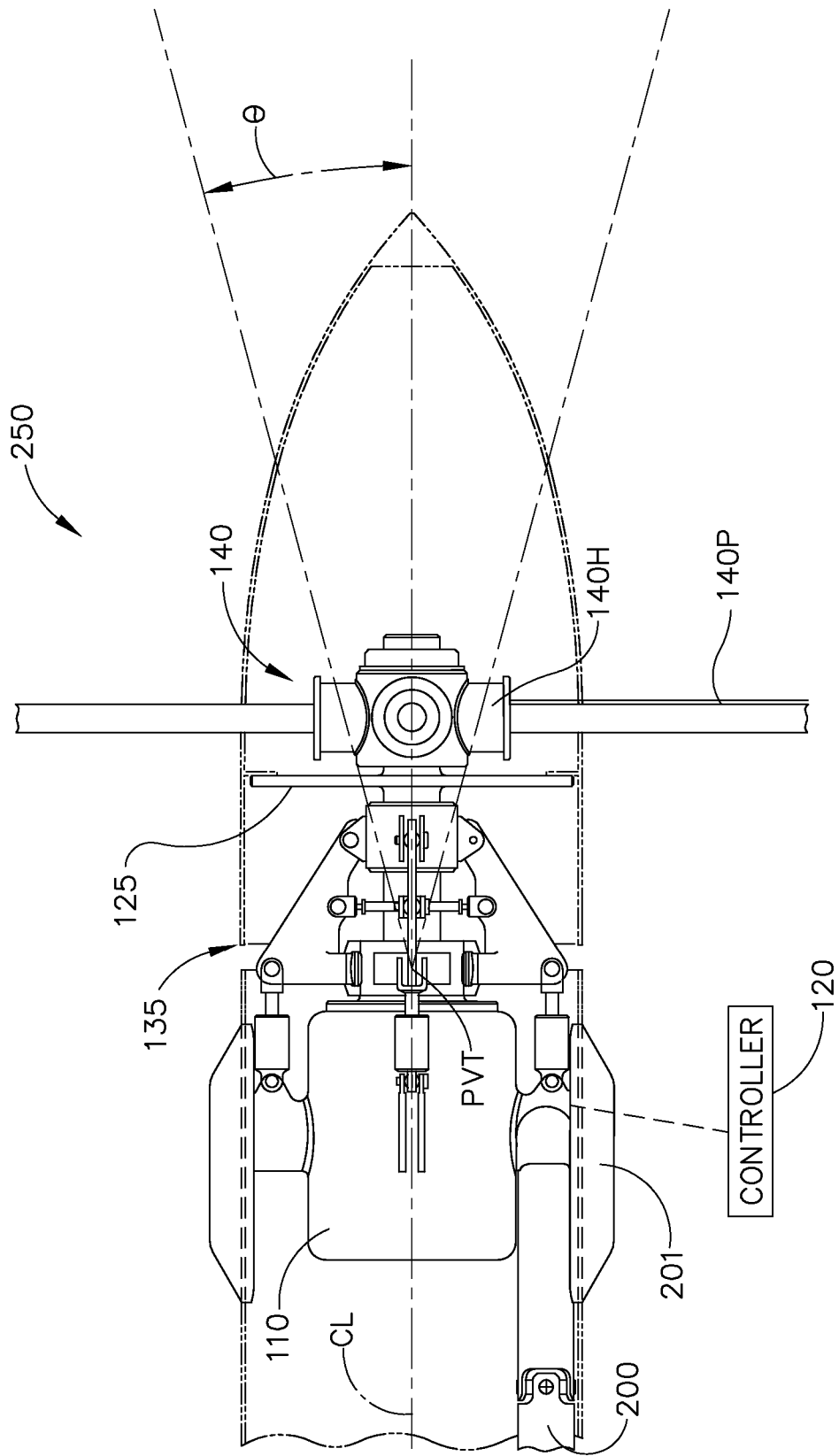
Figure 3:
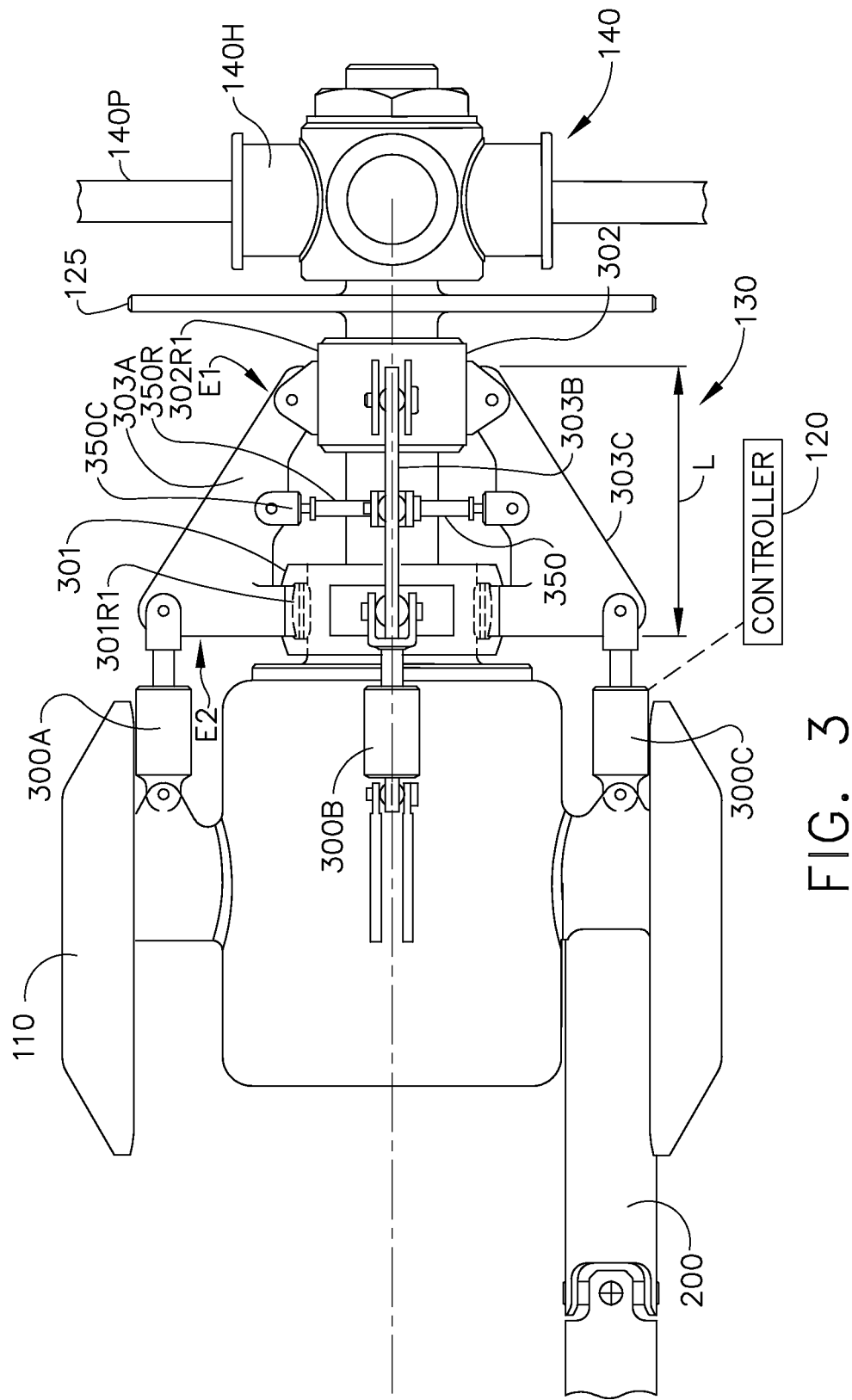
Figure 4:
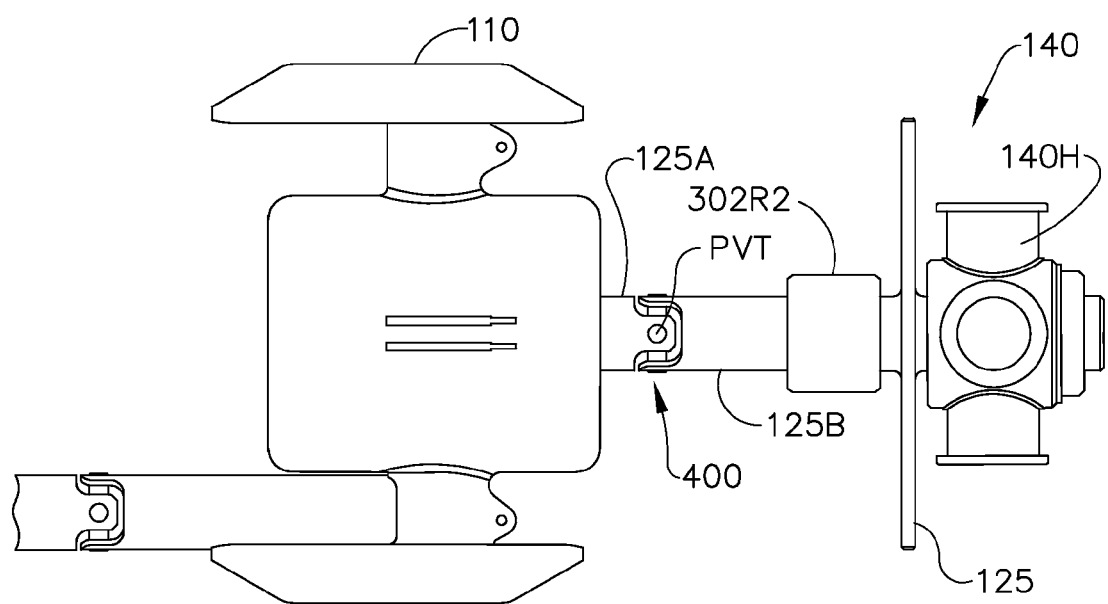
Figure 5:
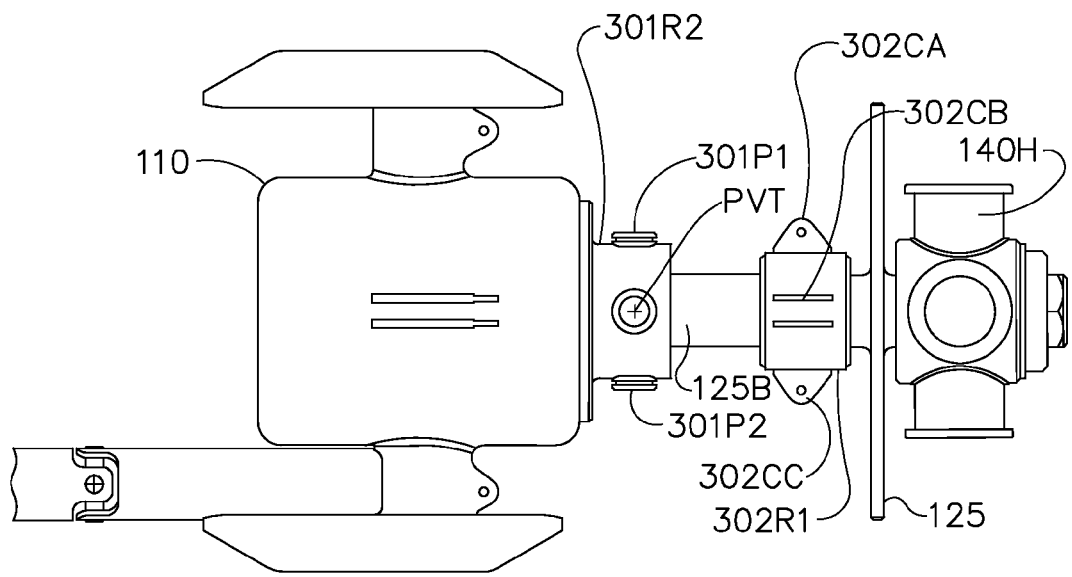
Figure 6:
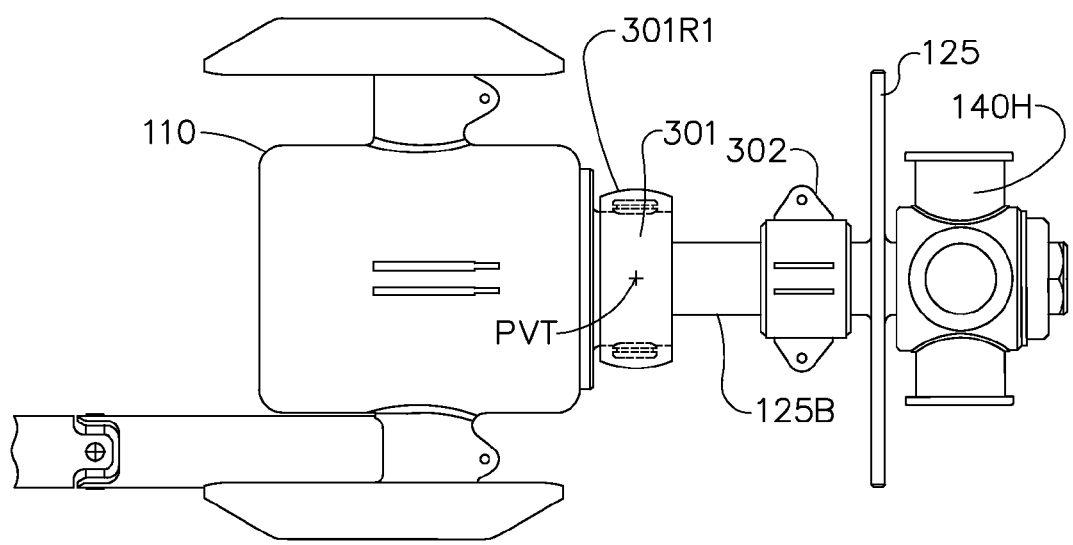
Figure 7:
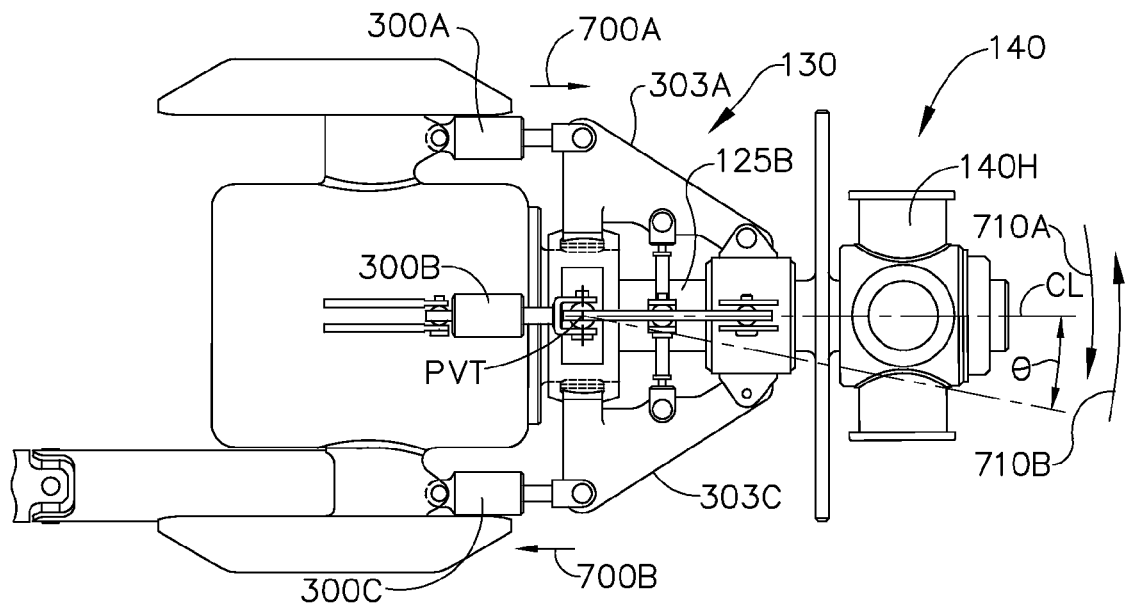
Figure 8:
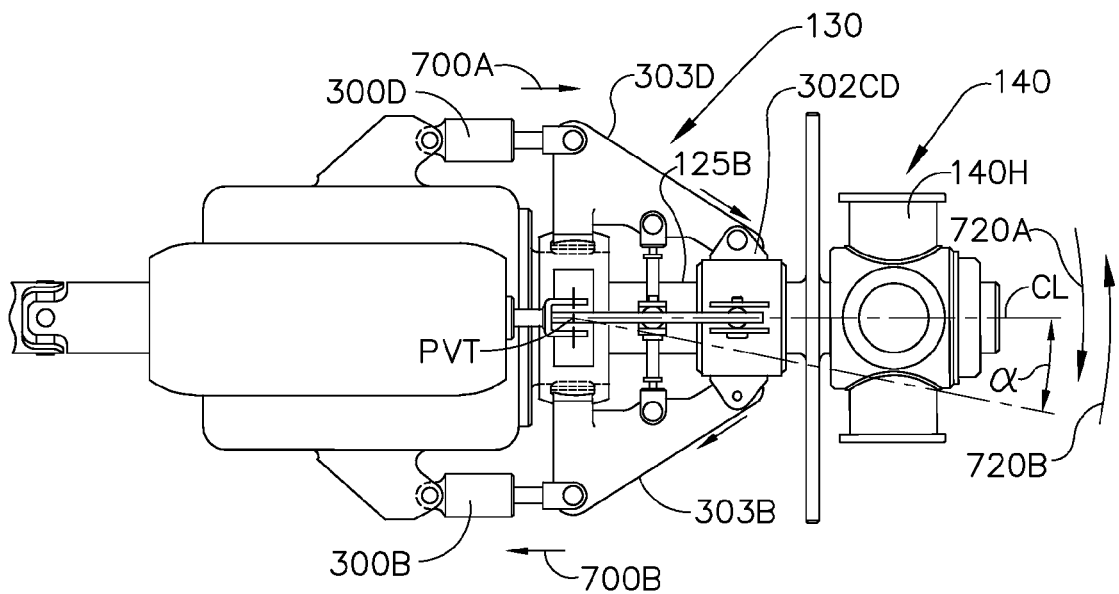
Figure 9:
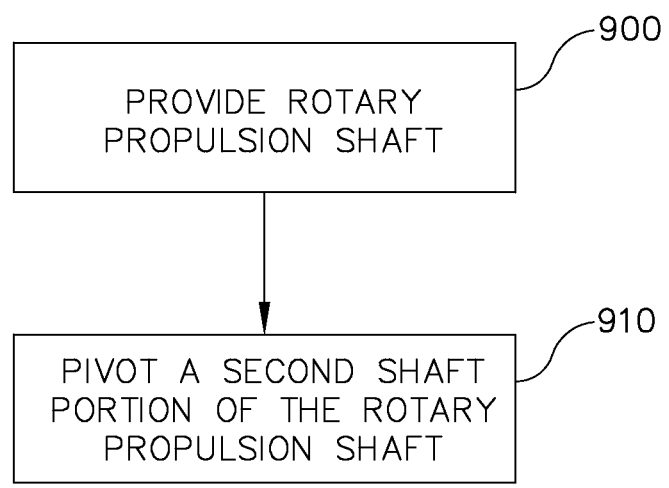
Figure 10:
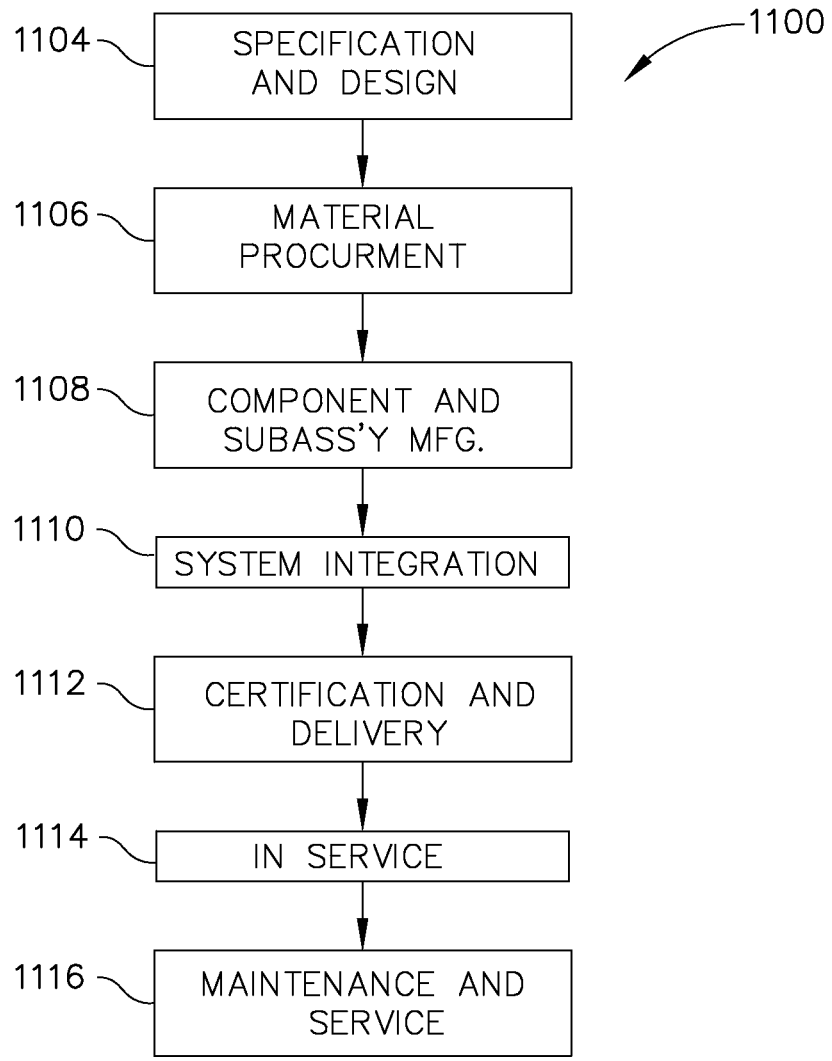
Figure 11:
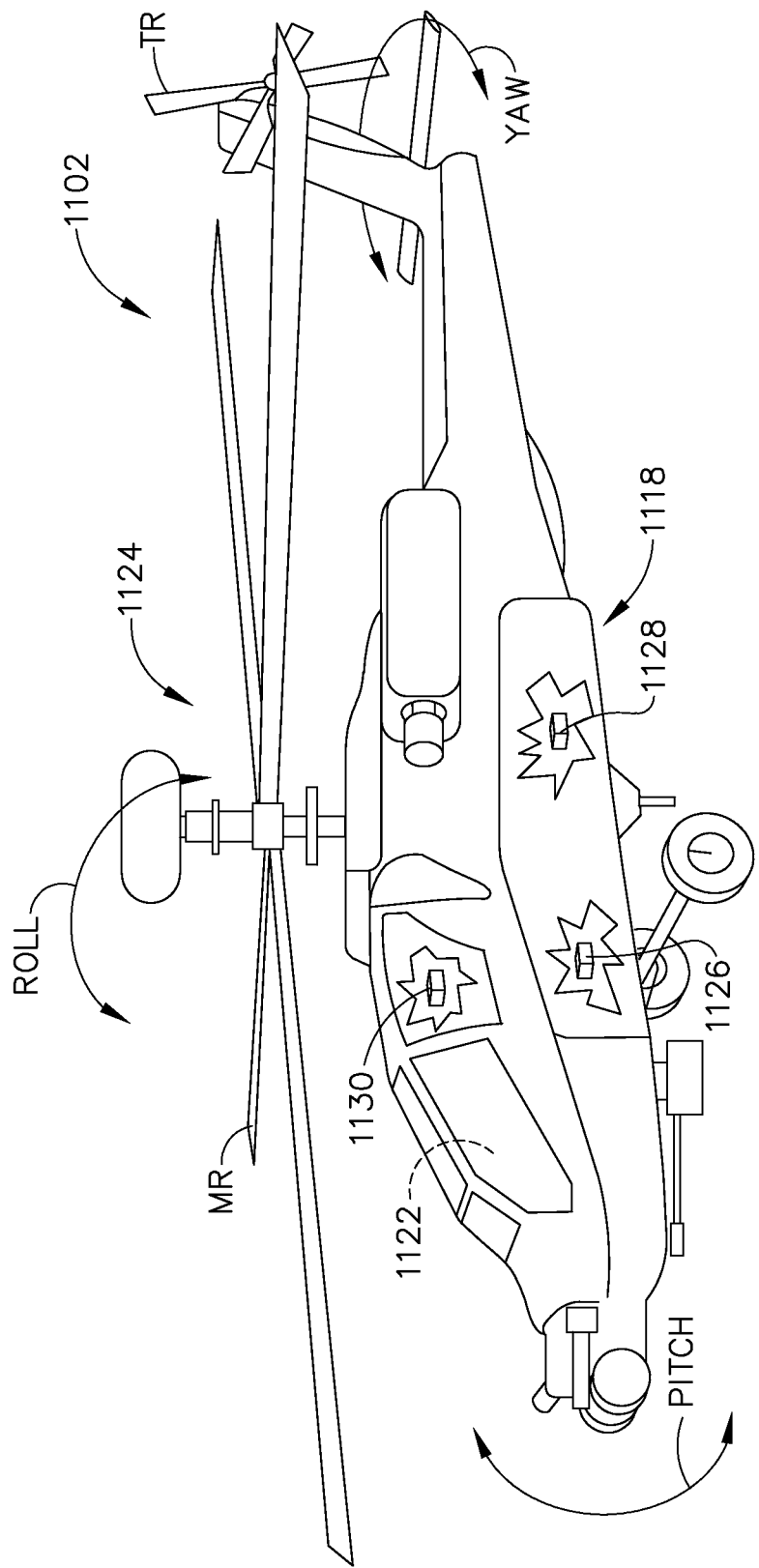

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a rotor control system in accordance with an aspect of the present disclosure;

FIG. 2 is a schematic illustration of a rotor assembly including a rotor control system in accordance with an aspect of the present disclosure;

FIG. 3 is a schematic illustration of a rotor control system in accordance with an aspect of the present disclosure;

FIG. 4 is a schematic illustration of a portion of a rotor control system in accordance with an aspect of the present disclosure;

FIG. 5 is a schematic illustration of a portion of a rotor control system in accordance with an aspect of the present disclosure;

FIG. 6 is a schematic illustration of a portion of a rotor control system in accordance with an aspect of the present disclosure;

FIG. 7 is a schematic illustration of pitch control in accordance with an aspect of the present disclosure;

FIG. 8 is a schematic illustration of roll or yaw control in accordance with an aspect of the present disclosure;

FIG. 9 is a flow diagram in accordance with an aspect of the present disclosure;

FIG. 10 is a flow diagram of aircraft production and service methodology;

FIG. 11 is a schematic illustration of an aircraft.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

Referring to FIG. 1, the present disclosure describes a rotor control apparatus 135 that reduces the complexity and/or reduces a weight of a rotor assembly by removing the swashplate mechanism conventionally employed for one or more of pitch, roll and yaw control of the rotor. The rotor control apparatus 135 may include a rotor control unit 130 that is coupled to the stationary frame 110 of any suitable vehicle 100 that is propelled by one or more propeller(s) or rotor(s) 140. The rotor control apparatus 135 may also include a rotary propulsion shaft 125 connected to a stationary frame 110 so as to rotate relative to the stationary frame 110 and the rotor control unit 130 as will be described in greater detail below.

As noted above, the vehicle 100 may be any vehicle that includes a propeller or rotor 140 for propulsion, such as for example, a fixed wing aircraft, a rotary wing aircraft or a watercraft (e.g. boat, ship, submarine, etc.). The vehicle 100 may include any suitable drive unit 115 such as a piston engine, turbine engine, electric engine, etc. that is connected to one end of the rotary propulsion shaft 125 in any suitable manner (e.g. such as through a gear box, a transmission, a direct coupling, etc.) for driving the rotary propulsion shaft 125. The rotor 140 may be coupled to an opposite end of the rotary propulsion shaft 125 so as to be controlled in one or more of pitch, roll and yaw. Referring briefly to FIG. 11, as may be realized, the dynamic parameters (e.g. pitch, roll and yaw) of the vehicle 100 that may be controlled by the rotor control apparatus 135 may depend on which rotor is being controlled, such as for example, the main rotor MR and/or a tail rotor TR (or a push rotor or any other vehicle). For example, control of the main rotor MR as described herein may provide one or more of pitch and roll control while control of the tail rotor as described herein may provide one or more of roll and yaw control (which may be combined with pitch control if a compound tilting of the rotor is performed such as where the tail rotor is swiveled about a pivot axis or point PVT to a push rotor configuration for controlling a pitch angle at the tail such as with aft center of gravity aircraft configurations).

Referring now to FIGS. 1 and 2, a simplified schematic illustration of a rotor assembly 250 is provided. As can be seen in FIG. 2, the rotor control apparatus 135 is coupled to any suitable stationary frame 110 of the vehicle 100 which may, in one aspect, be a transmission 201. The transmission 201 may be connected to the drive unit 115 in any suitable manner such as by drive shaft 200. In one aspect the transmission 201 may be a rotating transmission (e.g. the transmission may rotate about axis CL in any suitable manner and by any suitable drive system, in which case the stationary frame 110 formed by the rotating transmission is stationary in the sense that the rotation of the transmission is independent of the rotation of the rotary propulsion shaft 125 and the rotor 140. In another aspect the stationary frame 110 may form part of an airframe of the vehicle 100 while in other aspects the stationary frame 110 may be coupled to, for example, the airframe in any suitable manner. The rotary propulsion shaft 125 may extend from or through the stationary frame 110 for coupling with the rotor 140. In one aspect the rotor may include a rotor hub 140H that is fixed to the rotary propulsion shaft 125 so as to rotate as a unit with the rotary propulsion shaft 125. One or more rotor blades 140P may be fixed to the hub in any suitable manner.

Referring now to FIGS. 2, 3 and 4, as noted above, the rotor control apparatus 135 may include the rotary propulsion shaft 125, and a rotor control unit 130. The rotary propulsion shaft 125 may include a first shaft portion 125A and a second shaft portion 125B coupled to the first shaft portion 125A at any suitable joint 400. The first shaft portion 125A is configured to be coupled to a drive unit 115 (such as through the transmission 201 and drive shaft 200). The first shaft portion 125A may be rotatable about the axis CL and the joint 400 allows the second shaft portion 125B to rotate as a unit with the first shaft portion 125A. The second shaft portion 125B is pivotable relative to the centerline CL of the first shaft portion 125A in two degrees of freedom (e.g. to provide one or more of pitch, roll and yaw control) about the joint 400 so that the rotor 140 is also pivotable about the joint 400 in two degrees of freedom (e.g. the rotor 140 swivels about a pivot axis or point PVT of the joint 400).

The rotor control unit 130 may include a spherical bearing assembly or joint 301 that is mounted to the stationary frame 110 and a collar bearing assembly 302 that is mounted to the second shaft portion 125B. One or more control arms 303A, 303B, 303C, 303D (see also FIG. 8) extend between the spherical bearing assembly 301 and the collar bearing assembly 302 and couple an outer race 301R1 of the spherical bearing assembly 301 to an outer race 302R1 of the collar bearing assembly 302. A stabilizing member 350, which may be implemented as a ring, may be coupled to the one or more control arms 303A, 303B, 303C, 303D. One or more actuators 300A, 300B, 300C, 300D (see also FIG. 8) may couple a respective one of the control arm(s) 303A, 303B, 303C, 303D to the stationary frame 110 in any suitable manner. In this aspect there are four control arms 303A, 303B, 303C, 303D and four respective actuators 300A, 300B, 300C, 300D substantially equally spaced (e.g. about 90° apart) around the centerline CL or the rotary propulsion shaft 125 but in other aspects the spacing between the control arms may be any suitable spacing. In other aspects any suitable number of control arms and actuators having any suitable spacing between may be provided. For example, three actuators substantially equally spaced (e.g. about 120° apart around the centerline CL or rotary propulsion shaft 125) may be provided which may result in a weight reduction and reduced force-fighting between the actuators. The actuators 300A, 300B, 300C, 300D may be connected to any suitable controller 120 including any suitable memory and processor(s) for executing non-transitory program code resident in the memory to control the actuators 300A, 300B, 300C, 300D in the manner described herein. For example, electronic mixing of signals from the controller 120 may be provided as inputs to the actuators 300A, 300B, 300C, 300D to determine a desired extension/retraction of each actuator to achieve a desired amount of tilting of the second shaft portion 125B (and rotor 140).

Referring now to FIG. 4, an inner race 302R2 of the collar bearing assembly 302 may be coupled to the second shaft portion 125B in any suitable manner. The inner race 302R2 may be placed anywhere along a length of the second shaft portion 125B suitable for controlling a pivoting of the rotor 140 about a pivot axis PVT of the joint 400.

Referring now to FIG. 5, the outer race 302R1 of the collar bearing assembly 302 may be installed over the inner race 302R2 (or the inner and outer race may be installed on the second shaft portion as a unit) of the collar bearing assembly 302 so that rotation of the second shaft portion 125B is independent of any rotation of control arm mounts 302CA, 302CB, 302CC, 302CD (see also FIG. 8). In other aspects a complete bearing (e.g. inner and outer races) may be installed on the second shaft portion 125B in lieu of the inner race 302R2 and a sleeve having the features of the outer race 302R1 (e.g. the control arm mounts) may be attached over the complete bearing. The control arm mounts 302CA, 302CB, 302CC, 302CD may be circumferentially attached to the outer race 302R1 in any suitable manner and may be circumferentially spaced apart by any suitable spacing, which in this aspect may be substantially the same spacing as the actuators 300A, 300B, 300C, 300D and the control arms 303A, 303B, 303C, 303D, e.g. about 90° apart (where three actuators/control arms are provided the control arm mounts may be spaced about 120° apart). The collar bearing assembly 302 is configured to transmit forces from the control arms 303A, 303B, 303C, 303D to the second shaft portion 125B to pivot or otherwise swivel the second shaft portion 125B about the pivot axis PVT in one of two directions individually (e.g. one of the two degrees of freedom) or in a two directions simultaneously (e.g. in both degrees of freedom to swivel the second shaft portion 125B in a compound direction about pivot axis PVT). The collar bearing assembly 302 is configured to isolate rotation of the rotary propulsion shaft 125 from the rotor control unit 130 so that there are no dynamic rotating components when the second shaft portion 125B, and hence the rotor 140, is pivoting about the pivot axis PVT (e.g. the rotor control unit 130 does not rotate with the rotary propulsion shaft 125).

A bearing support 301R2 of the spherical bearing assembly 301 may be coupled to the stationary frame 110 in any suitable manner so that the rotary propulsion shaft 125 is not in contact with the bearing support 301R2. The bearing support 301R2 is configured so that, when mounted to the stationary frame 110, a pivot axis of the outer race 301R is coincident with the pivot axis PVT of joint 400. The at least the outer race 301R1 of the spherical bearing assembly 301 may be coupled to the bearing support 301R2 in any suitable manner such as through any suitable number of pins 301P1, 301P2 arranged circumferentially around the bearing support 301R2 in any suitable manner. In one aspect two pins 301P1, 302P2 may be attached to the bearing support 301R1 in any suitable manner so as to be spaced about 180° apart from each other. Referring to FIG. 6, the spherical bearing 301 is attached to the pins 301P1, 301P2 in any suitable manner so as to allow the outer race 301R1 of the spherical bearing 301 and the second shaft portion 125B to pivot about the pivot axis PVT.

Referring again to FIG. 3 the stabilizing member 350 that is common to each of the control arms 303A, 303B, 303C, 303D may be placed around the rotary propulsion shaft 125. The stabilizing member 350 may include a ring portion 350R and one or more connecting portions 350C radially extending from the ring portion 350R. The one or more connecting portions 350C corresponding to a respective one of the control arms 303A, 303B, 303C, 303D. The rotary propulsion shaft 125 may extend through the ring portion 350R so as to rotate relative to the ring portion 350R (e.g. there is substantially no contact between the rotary propulsion shaft 125 and the stabilizing member 350). In one aspect the connecting portions 350C may be clevis fittings or any other suitable coupling member that couples a respective control arm 303A, 303B, 303C, 303D to the ring portion 350R. Each of the connecting portions 350C may be adjustable so at to radially pull or push the connecting members towards or away from each other to effect adjustment of a contact pressure of the control arms 303A, 303B, 303C, 303D against one or more of the collar bearing assembly 302 and the spherical bearing assembly 301 while allowing the pivoting of the second shaft portion 125B (and the rotor coupled thereto).

As described above, the one or more control arms 303A, 303B, 303C, 303D (see also FIG. 8) extend between the spherical bearing assembly 301 and the collar bearing assembly 302. A first end E1 of each control arm 303A, 303B, 303C, 303D may be coupled control arm mounts 302CA, 302CB, 302CC, 302CD of the collar bearing assembly in any suitable manner, such as for example, by clevis fittings. As second end E2 of each control arm may be attached to the spherical bearing assembly in any suitable manner such as with, for example, mechanical fasteners, welding, etc. The stabilizing member 350 may be coupled each of the control arms 303A, 303B, 303C, 303D at any point along a length L, between the first and second ends E1, E2, of the of a respective control arm 303A, 303B, 303C, 303D.

The second end of each control arm 303A, 303B, 303C, 303D may be coupled to the stationary frame 110 by a respective actuator 300A, 300B, 300C, 300D. The actuators may be any suitable actuators, such as linear actuators, that are electrically actuated, hydraulically actuated, pneumatically actuated or actuated in any other suitable manner.

In one aspect the collar bearing assembly 302, the control arms 303A, 303B, 303C, 303D, the stabilizing member 350 and a housing for the spherical bearing assembly 301 (with both inner and outer races) may be combined into an integral component which may reduce weight, part count, tolerance stack up, flexibility and overall complexity of the system.

Referring now to FIGS. 7 and 9, in operation the rotary propulsion shaft having the first and second shaft portions 125A, 125B may be provided in a vehicle such as a rotary wing aircraft (FIG. 9, Block 900). The second shaft portion 125B and the rotor 140 attached thereto may be pivoted about the pivot axis PVT in one or more of the two degrees of freedom (e.g. in one of pitch, roll or yaw) (FIG. 9, Block 910) where the actuators 300A, 300B, 300C, 300D work in pairs. For example, for pivoting the second shaft portion 125B in a first one of the two degrees of freedom, actuator 300A may be operated to extend in the direction of arrow 700A and push against the control arm 303A to pivot the rotor control unit 130 by an amount θ in the direction of arrow 710A about the pivot axis PVT. In one aspect, the actuators may be double acting actuators such that actuator 300C is actuated to retract in the direction of arrow 700B and pull or otherwise move control arm 303C to, along with the movement of actuator 300A, pivot the rotor control unit 130 by the amount θ in the direction of arrow 710A about the pivot axis PVT. The amount θ through which the second shaft portion 125B may be rotated may be in the range of about 10° to about 20°. Similarly, to pivot the second shaft portion 125B and the rotor 140 on the opposite side of the centerline CL in the first degree of freedom, actuator 300C may be operated to extend in the direction of arrow 700A to push or otherwise move control arm 300C and the actuator 300A may be operated to retract in the direction of arrow 700B to pull or otherwise move control arm 300A so that the rotor control unit 130 pivots by the amount θ in the direction of arrow 710B. In other aspects, where the actuators are single acting actuators the actuator 300A may be operated to rotate the rotor control unit 130 in the direction of arrow 710A and the actuator 300C may be operated to rotate the rotor control unit 130 in the direction of arrow 710B.

Also referring to FIG. 8, the second shaft portion 125B and the rotor 140 attached thereto may be pivoted about the pivot axis PVT in another of the two degrees of freedom (e.g. in another one of pitch, roll or yaw) (FIG. 9, Block 910). For example, for pivoting the second shaft portion 125B in a second one of the two degrees of freedom actuator 300D may be operated to extend in the direction of arrow 700A and push against the control arm 303D to pivot the rotor control unit 130 by an amount α in the direction of arrow 720A about the pivot axis PVT. In one aspect, as noted above, the actuators may be double acting actuators such that actuator 300B is actuated to retract in the direction of arrow 700B and pull or otherwise move control arm 303B to, along with the movement of actuator 300D, pivot the rotor control unit 130 by the amount α in the direction of arrow 720A about the pivot axis PVT. The amount α through which the second shaft portion 125B may be rotated may be substantially similar to the amount θ, e.g., in the range of about 10° to about 20°. In one aspect the amounts θ and α may be any suitable degrees of rotation that are substantially similar to each other or different from each other. Similarly, to pivot the second shaft portion 125B and the rotor 140 on the opposite side of the centerline CL in the second degree of freedom actuator 300B may be operated to extend in the direction of arrow 700A to push or otherwise move control arm 300B and the actuator 300D may be operated to retract in the direction of arrow 700B to pull or otherwise move control arm 300D so that the rotor control unit 130 pivots by the amount α in the direction of arrow 720B. In other aspects, where the actuators are single acting actuators the actuator 300D may be operated to rotate the rotor control unit 130 in the direction of arrow 720A and the actuator 300B may be operated to rotate the rotor control unit 130 in the direction of arrow 720B.

As may be realized, the second shaft portion 125B and the rotor 140 may be pivoted in both the first and second degrees of freedom simultaneously to produce a compound rotor movement. For example, actuators 300A, 300B may be actuated to extend in the direction of arrow 700A while actuators 300C and 300D are actuated to retract in the direction of arrow 700B so that the rotor control unit 130 pivots the second shaft portion 125B and the rotor 140 by any suitable angle about the pivot axis PVT in a direction that is a combination of arrows 710A, 720B. It should be understood that the actuators 300A, 300B, 300C, 300D may be actuated in any suitable combination to pivot the second shaft portion 125B and the rotor 140 relative to the centerline CL so as to provide the rotor with any suitable orientation within the range of motion of the two degrees of freedom. As may be realize, where three actuators/control arms are provided the three actuators may operate simultaneously for swiveling the second shaft portion 125B and the rotor in the two degrees of freedom as described herein.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 10 and an aircraft 1102 as shown in FIG. 11. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, the aircraft 1102 produced by the illustrative method 1100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. Although an aerospace example is shown, the principles of the invention may be applied to other industries, such as the maritime industry or any other industry which manufactures crafts/vehicles using propellers or rotors for propulsion.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

In one aspect of the present disclosure an apparatus for controlling a rotor of a rotary wing aircraft includes a stationary frame, a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint, and at least one actuator coupled to the stationary frame at one end and connected to the second shaft portion at the other end so that the second shaft portion rotates relative to the at least one actuator, the at least one actuator being configured to pivot the second shaft portion in the two degrees of freedom.

In one aspect of the present disclosure a spherical bearing is mounted to the stationary frame so that a pivot axis of the spherical bearing is coincident with a pivot axis of the joint.

In one aspect of the present disclosure the apparatus further includes a bearing assembly mounted to the second shaft portion; and at least one control arm coupling the spherical bearing to the bearing assembly; wherein the at least one actuator is coupled at the other end to a respective one of the at least one control arm for effecting pivoting of the second shaft portion in the two degrees of freedom.

In one aspect of the present disclosure the at least one actuator is pivotally coupled to the stationary frame and the respective one of the at least one control arm.

In one aspect of the present disclosure the at least one actuator comprises at least one pitch actuator and at least one yaw actuator.

In one aspect of the present disclosure the at least one actuator comprises a pair of opposing pitch actuators and a pair of opposing yaw actuators.

In one aspect of the present disclosure the apparatus further includes a tilt control unit connecting the stationary frame to the second shaft portion, the tilt control unit being coupled to the other end of the at least one actuator and having a pivot axis that is coincident with a pivot axis of the joint, the at least one actuator being configured to pivot the tilt control unit to effect the two degree of freedom movement of the second shaft portion.

In one aspect of the present disclosure the tilt control unit includes a spherical bearing that defines the pivot axis of the tilt control unit.

In one aspect the present disclosure a rotary wing aircraft includes a frame; a tail rotor connected to the frame, the tail rotor including a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint; and at least one actuator connected to the frame at one end and connected to the second shaft portion at the other end so that the second shaft portion rotates relative to the at least one actuator, the at least one actuator being configured to pivot the second shaft portion in the two degrees of freedom.

In one aspect the present disclosure the tail rotor further comprises a spherical bearing mounted to the frame so that a pivot axis of the spherical bearing is coincident with a pivot axis of the joint.

In one aspect the present disclosure the tail rotor further includes a bearing assembly mounted to the second shaft portion; and at least one control arm coupling the spherical bearing to the bearing assembly; wherein the at least one actuator is coupled at the other end to a respective one of the at least one control arm for effecting pivoting of the second shaft portion in the two degrees of freedom.

In one aspect the present disclosure the at least one actuator is pivotally coupled to the frame and the respective one of the at least one control arm.

In one aspect the present disclosure the at least one actuator comprises at least one pitch actuator and at least one yaw actuator.

In one aspect the present disclosure the at least one actuator comprises a pair of opposing pitch actuators and a pair of opposing yaw actuators.

In one aspect the present disclosure the tail rotor includes a tilt control unit connecting the frame to the second shaft portion, the tilt control unit being coupled to the other end of the at least one actuator and having a pivot axis that is coincident with a pivot axis of the joint, the at least one actuator being configured to pivot the tilt control unit to effect the two degree of freedom movement of the second shaft portion.

In one aspect the present disclosure the tilt control unit includes a spherical bearing that defines the pivot axis of the tilt control unit.

In one aspect the present disclosure the tilt control unit does not rotate about the centerline of the first shaft portion or a centerline of the second shaft portion.

In one aspect the present disclosure a method includes providing a rotary wing aircraft with a rotary propulsion shaft having a first shaft portion and a second shaft portion so that the second shaft portion is pivotable relative to a centerline of the first shaft portion in two degrees of freedom about a joint; and pivoting the second shaft portion in the two degrees of freedom with at least one actuator connecting a non-rotatable frame of the rotary wing aircraft to the second shaft portion so that the second shaft portion rotates relative to the at least one actuator.

In one aspect the present disclosure the pivoting the second shaft portion includes pivoting a tilt control unit, that connects the at least one actuator to the second shaft portion, about a pivot axis of a spherical bearing of the tilt control unit where the pivot axis of the spherical bearing is coincident with a pivot axis of the joint.

In one aspect the present disclosure the method further includes controlling pitch and yaw through the pivoting of the second shaft portion.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An apparatus for controlling a rotor of a rotary wing aircraft, comprising:
    a stationary frame;
    a rotary propulsion shaft extending through the stationary frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint;
    a bearing assembly mounted to the second shaft portion;
    a spherical bearing mounted to the stationary frame;
    at least one control arm coupling the spherical bearing to the bearing assembly;
    a stabilizing member that is common to each of the at least one control arm, the stabilizing member being configured to adjust a contact pressure of each control arm against one or more of the bearing assembly and spherical bearing while allowing pivoting of the second shaft portion; and
    at least one actuator coupled to the stationary frame at one end and connected to the second shaft portion at the other end so that the second shaft portion rotates relative to the at least one actuator, the at least one actuator being substantially parallel with the rotary propulsion shaft and configured to pivot the second shaft portion in the two degrees of freedom.

2. The apparatus of claim 1, wherein the spherical bearing is mounted to the stationary frame so that a pivot axis of the spherical bearing is coincident with a pivot axis of the joint.

3. The apparatus of claim 2, wherein the at least one actuator is coupled at the other end to a respective one of the at least one control arm for effecting pivoting of the second shaft portion in the two degrees of freedom.

4. The apparatus of claim 3, wherein the at least one actuator is pivotally coupled to the stationary frame and the respective one of the at least one control arm.

5. The apparatus of claim 1, wherein the at least one actuator comprises at least one pitch actuator and at least one yaw actuator.

6. The apparatus of claim 1, wherein the at least one actuator comprises a pair of opposing pitch actuators and a pair of opposing yaw actuators.

7. The apparatus of claim 1, further comprising a tilt control unit connecting the stationary frame to the second shaft portion, the tilt control unit being coupled to the other end of the at least one actuator and having a pivot axis that is coincident with a pivot axis of the joint, the at least one actuator being configured to pivot the tilt control unit to effect the two degree of freedom movement of the second shaft portion.

8. The apparatus of claim 7, wherein the tilt control unit includes a spherical bearing that defines the pivot axis of the tilt control unit.

9. A rotary wing aircraft comprising:
a frame;
a tail rotor connected to the frame, the tail rotor including
a rotary propulsion shaft extending through the frame, the propulsion shaft having a first shaft portion and a second shaft portion coupled to the first shaft portion at a joint, the first shaft portion being configured to be coupled to a drive unit and the second shaft portion being pivotable relative to a centerline of the first shaft portion in two degrees of freedom about the joint;
a bearing assembly mounted to the second shaft portion;
a spherical bearing mounted to the stationary frame;
at least one control arm coupling the spherical bearing to the bearing assembly;
a stabilizing member that is common to each of the at least one control arm, the stabilizing member being configured to adjust a contact pressure of each control arm against one or more of the bearing assembly and spherical bearing while allowing pivoting of the second shaft portion; and
at least one actuator connected to the frame at one end and connected to the second shaft portion at the other end so that the second shaft portion rotates relative to the at least one actuator, the at least one actuator being substantially parallel with the rotary propulsion shaft and configured to pivot the second shaft portion in the two degrees of freedom.

10. The rotary wing aircraft of claim 9, wherein the spherical bearing is mounted to the frame so that a pivot axis of the spherical bearing is coincident with a pivot axis of the joint.

11. The rotary wing aircraft of claim 10, wherein the at least one actuator is coupled at the other end to a respective one of the at least one control arm for effecting pivoting of the second shaft portion in the two degrees of freedom.

12. The rotary wing aircraft of claim 11, wherein the at least one actuator is pivotally coupled to the frame and the respective one of the at least one control arm.

13. The rotary wing aircraft of claim 9, wherein the at least one actuator comprises at least one pitch actuator and at least one yaw actuator.

14. The rotary wing aircraft of claim 9, wherein the at least one actuator comprises a pair of opposing pitch actuators and a pair of opposing yaw actuators.

15. The rotary wing aircraft of claim 9, wherein the tail rotor includes a tilt control unit connecting the frame to the second shaft portion, the tilt control unit being coupled to the other end of the at least one actuator and having a pivot axis that is coincident with a pivot axis of the joint, the at least one actuator being configured to pivot the tilt control unit to effect the two degree of freedom movement of the second shaft portion.

16. The rotary wing aircraft of claim 15, wherein the tilt control unit includes a spherical bearing that defines the pivot axis of the tilt control unit.

17. The rotary wing aircraft of claim 15, wherein the tilt control unit does not rotate about the centerline of the first shaft portion or a centerline of the second shaft portion.

18. A method comprising:
providing a rotary wing aircraft with a rotary propulsion shaft having a first shaft portion and a second shaft portion so that the second shaft portion is pivotable relative to a centerline of the first shaft portion in two degrees of freedom about a joint; and
pivoting the second shaft portion in the two degrees of freedom with at least one actuator that is arranged substantially parallel to the rotary propulsion shaft and connecting a non-rotatable frame of the rotary wing aircraft to the second shaft portion so that the second shaft portion rotates relative to the at least one actuator;
wherein control arms are connected to both a spherical bearing mounted to the non-rotatable frame and a bearing assembly mounted to the second shaft portion and a contact pressure of each control arm against one or more of the spherical bearing and the bearing assembly is adjusted with a stabilizing member that is common to each control arm.

19. The method of claim 18, wherein the pivoting the second shaft portion includes pivoting a tilt control unit, that connects the at least one actuator to the second shaft portion, about a pivot axis of the spherical bearing of the tilt control unit where the pivot axis of the spherical bearing is coincident with a pivot axis of the joint.

20. The method of claim 18, further comprising controlling pitch and yaw through the pivoting of the second shaft portion.

* * * * *